US011760881B1

(12) United States Patent
Drbohlav, III et al.

(10) Patent No.: US 11,760,881 B1
(45) Date of Patent: Sep. 19, 2023

(54) CRACK SEALANT METHOD AND COMPOSITION FOR RESISTANCE TO UV AGING AND WEATHERING

(71) Applicant: ADVENTUS MATERIAL STRATEGIES, LLC, Daniel Island, SC (US)

(72) Inventors: Joseph Drbohlav, III, Inman, SC (US); Joseph J. Lorenc, Philadelphia, PA (US); Thomas John Haslett, Broadbeach Waters (AU)

(73) Assignee: Adventus Material Strategies, LLC, Daniel Island, SC (US)

( * ) Notice: Subject to any disclaimer, the term of this patent is extended or adjusted under 35 U.S.C. 154(b) by 239 days.

(21) Appl. No.: 17/225,369

(22) Filed: Apr. 8, 2021

Related U.S. Application Data

(63) Continuation-in-part of application No. 16/984,771, filed on Aug. 4, 2020.

(60) Provisional application No. 62/958,558, filed on Jan. 8, 2020.

(51) Int. Cl.
*C08L 95/00* (2006.01)
*C08K 3/22* (2006.01)
*E01C 11/00* (2006.01)
*E01C 7/14* (2006.01)

(52) U.S. Cl.
CPC ............... *C08L 95/00* (2013.01); *C08K 3/22* (2013.01); *C08K 2003/2241* (2013.01); *C08L 2201/08* (2013.01); *C08L 2555/10* (2013.01); *C08L 2555/50* (2013.01); *C08L 2555/64* (2013.01); *C08L 2555/84* (2013.01); *E01C 7/147* (2013.01); *E01C 11/005* (2013.01)

(58) Field of Classification Search
None
See application file for complete search history.

(56) References Cited

U.S. PATENT DOCUMENTS

| | | | | | |
|---|---|---|---|---|---|
| 2,213,806 | A | * | 9/1940 | Sorem | C04B 41/62 264/340 |
| 3,112,681 | A | * | 12/1963 | Gessler | C08K 3/34 260/998.19 |
| 4,629,754 | A | * | 12/1986 | Syrier | C08L 57/02 524/68 |
| 6,514,595 | B1 | * | 2/2003 | Sprouts | C04B 28/34 106/676 |
| 8,088,858 | B2 | | 1/2012 | Pharr | |
| 8,814,465 | B2 | | 8/2014 | Vitale et al. | |
| 9,499,948 | B2 | | 11/2016 | Greer et al. | |
| 11,572,472 | B2 | * | 2/2023 | Majeska | C08L 93/04 |
| 2008/0168926 | A1 | * | 7/2008 | Muller | E01C 7/182 404/31 |
| 2010/0233146 | A1 | ‡ | 9/2010 | McDaniel | A01N 63/50 424/94.2 |
| 2011/0257318 | A1 | | 10/2011 | Neuville et al. | |
| 2014/0083331 | A1 | ‡ | 3/2014 | Fini | C09D 195/00 106/284.4 |
| 2017/0008803 | A1 | * | 1/2017 | Muncy | C08L 95/005 |
| 2017/0190619 | A1 | * | 7/2017 | Crews | C09D 7/43 |
| 2017/0191008 | A1 | * | 7/2017 | Baseeth | C09K 8/035 |
| 2018/0201716 | A1 | * | 7/2018 | Kameda | C09J 125/10 |
| 2018/0215919 | A1 | * | 8/2018 | Reinke | C08L 95/00 |
| 2018/0371704 | A1 | | 12/2018 | Wilkins et al. | |
| 2019/0177925 | A1 | ‡ | 6/2019 | Kriech | C08L 95/00 |
| 2019/0226159 | A1 | ‡ | 7/2019 | Marienfeld | E01C 7/185 |
| 2019/0256417 | A1 | ‡ | 8/2019 | Stepp | C08L 17/00 |

FOREIGN PATENT DOCUMENTS

| | | |
|---|---|---|
| FR | 2995890 A1 | 9/2012 |
| KR | 102054908 B1 | 2/2017 |
| KR | 101820380 B1 | 6/2017 |

OTHER PUBLICATIONS

Crumb Rubber; Wikipedia (https://en.wikipedia.org/wiki/Crumb_rubber>]); p. 2; US.‡
PCT International Search Report and Written Opinion; PCT/US2020/044876; dated Oct. 8, 2020; US.‡

\* cited by examiner
‡ imported from a related application

*Primary Examiner* — John J Figueroa
(74) *Attorney, Agent, or Firm* — Dennis D. Brown; Brown Patent Law, P.L.L.C.

(57) ABSTRACT

An asphaltic sealant composition and method which use (a) the incorporation of one or more pigment and/or UV absorbing materials, (b) a low shear production method, and (c) the addition of an epoxidized ester of a vegetable oil or a plasticizer, effective for increasing the degree of dispersion of the pigment material in the sealant composition, to provide improve resistance to UV radiation.

12 Claims, No Drawings

CRACK SEALANT METHOD AND COMPOSITION FOR RESISTANCE TO UV AGING AND WEATHERING

RELATED CASE

This application is a continuation-in-part of pending U.S. patent application Ser. No. 16/984,771, filed Aug. 4, 2020, which claims the benefit of U.S. Provisional Patent Application Ser. No. 62/958,558 filed on Jan. 8, 2020.

FIELD OF THE INVENTION

The present invention relates to asphaltic sealant compositions, methods of production, and methods of use for sealing cracks and joints in roads, pavements, or other asphalt or concrete substrates.

BACKGROUND OF THE INVENTION

A need exists for an improved asphaltic crack sealing composition and method which provide increased resistance to UV exposure. It is well known in the art that road construction and repair materials suffer from accelerated chemical degradation and oxidative deterioration due to exposure to UV radiation from sunlight.

A need also exists for a crack sealant composition and method that would be effective for sealing cracks and joints without creating excessive contrast in color between the sealant material and the underlying pavement substrate. Commonly used crack sealants are typically formulated using asphalt or bitumen and therefore have a deep black color that creates a significant visual contrast with the underlying concrete or aged (oxidized) asphalt pavement surface. This contrast is unappealing and can interfere with the ability of automobile self-driving or self-steering sensor systems to identify lane markings.

A need also exists for a crack sealant composition and method that (a) would be effective for sealing cracks and joints in reddish pavement substrates, such as, e.g., pavements formed of red granite aggregates, and (b) would match or would not greatly contrast with the color of these reddish pavements.

SUMMARY OF THE INVENTION

The present invention alleviates the problems and satisfies the needs mentioned above. In one aspect, we have discovered that the use of a pigment material, preferably titanium dioxide, or a UV absorbing material in an asphaltic sealant composition along with an effective amount of a dispersing agent, preferably an epoxidized ester of a vegetable oil or a plasticizer, for obtaining enhanced dispersion of the pigment material will substantially and surprisingly increase the resistance of the asphaltic sealant composition to deterioration, aging and weathering caused by UV exposure.

In another aspect, there is provided a sealant composition that preferably comprises asphalt, one or more polymers, crumb rubber, plasticizing oils, and a pigment, preferably rutile titanium dioxide or iron (III) oxide, which causes the color of the sealant composition to have less contrast to an aged asphalt, concrete, aggregate, or other pavement substrate on which the sealant composition is used.

In another aspect. there is provided a process for producing the inventive sealant which optimizes the dispersion and effectiveness of the pigment in the sealant composition to increase the UV resistance of the composition and also create the best optical effect in terms of minimizing contrast with the pavement substrate.

In another aspect, there is provided an asphaltic sealant composition which is resistant to UV exposure. The asphaltic sealant composition preferably comprises: (a) a base asphalt material in an amount of at least 50% by weight based upon a total weight of the asphaltic sealant composition; (b) one or more pigment and/or UV absorbing materials of a type and in a total amount effective to provide a modified ASTM C793-05 (Reapproved 2017) test result for the asphaltic sealant composition; and (c) one or more dispersing agents selected from epoxidized esters of vegetable oils, plasticizers, or combinations thereof in an amount, greater than or equal to 1% by weight based upon the total weight of the asphaltic sealant composition, effective to provide a degree of dispersion of the one or more pigment and/or UV absorbing materials in the asphaltic sealant composition to provide the modified ASTM C793-05 (Reapproved 2017) test result. The modified ASTM C793-05 (Reapproved 2017) test result is preferably that, after 500 hours of exposure of the asphaltic sealant composition in a fluorescent UV laboratory accelerated weathering device, the asphaltic sealant composition, when cooled to a temperature of 0° C., will not break into two or more pieces when bent 180° around a steel mandrel which is 12.7 mm in diameter.

In another aspect, there is provided a method of increasing a level of resistance of an asphaltic sealant product to UV exposure. The method preferably comprises the step (a) of preparing an asphaltic concentrate composition (preferably comprising from 40% to 70% by weight, based upon the total weight of the asphaltic concentrate composition, of a base asphalt material) by (i) adding to the base asphalt material one or more pigment and/or UV absorbing materials of a type and in a total amount effective to provide a modified ASTM C793-05 (Reapproved 2017) test result for the asphaltic sealant product and (ii) also adding to the base asphalt material one or more dispersing agents selected from epoxidized esters of vegetable oil, plasticizers, or combinations thereof in an amount, greater than or equal to 2% by weight based upon the total weight of the asphaltic concentrate composition, effective to provide a degree of dispersion of the one or more pigment and/or UV absorbing materials in the asphaltic sealant product to provide the modified ASTM C793-05 (Reapproved 2017) test result. The method also preferably comprises the further steps of: (b) mixing the asphaltic concentrate composition using a mixer operating at less than 750 rpm; (c) adding one or more letdown composition materials to the asphaltic concentrate composition to form the asphaltic sealant product, the one or more letdown composition materials comprising an additional amount of the base asphalt material; and (d) mixing the asphaltic sealant product using a mixer operating at less than 750 rpm. The asphaltic concentrate composition preferably forms from 35% to 75% by weight of the asphaltic sealant product, based upon the total weight of the asphaltic sealant product. The modified ASTM C793-05 (Reapproved 2017) test result is preferably that, after 500 hours of exposure of the asphaltic sealant product in a fluorescent UV laboratory accelerated weathering device, the asphaltic sealant product, when cooled to a temperature of 0° C., will not break into two or more pieces when bent 1800 around a steel mandrel which is 12.7 mm in diameter.

In another aspect, there is provided a method of sealing a crack or a joint in a road, pavement, or other asphalt or concrete substrate for increased resistance to UV exposure.

The method preferably comprises the step (a) of preparing an asphaltic concentrate composition (preferably comprising an amount of a base asphalt material in a range of from 40% to 70% by weight based upon the total weight of the asphaltic concentrate composition) by (i) adding to the base asphalt material an amount of rutile titanium dioxide which is effective to provide a modified ASTM C793-05 (Reapproved 2017) test result for an asphaltic sealant product and (ii) also adding to the base asphalt material one or more dispersing agents selected from epoxidized esters of vegetable oils, plasticizers, or combinations thereof in an amount, greater than or equal to 2% by weight based upon the total weight of the asphaltic concentrate composition, effective to provide a degree of dispersion of the rutile titanium dioxide in the asphaltic sealant product to provide the modified ASTM C793-05 (Reapproved 2017) test result. The method also preferably comprises the further steps of: (b) mixing the asphaltic concentrate composition using a mixer operating at less than 750 rpm; (c) adding letdown materials to the asphaltic concentrate composition to form the asphaltic sealant product; (d) mixing the asphaltic sealant product using a mixer operating at less than 750 rpm; and (e) applying the asphaltic sealant product to a crack or a joint in a road, pavement, or other asphalt or concrete substrate. The asphaltic concentrate composition preferably forms from 35% to 75% by weight of the asphaltic sealant product, based upon the total weight of the asphaltic sealant product. The letdown composition materials preferably comprise (i) an additional amount of the base asphalt material and (ii) a radial SBS polymer, a linear SBS polymer, and/or crumb rubber. The modified ASTM C793-05 (Reapproved 2017) test result is preferably that, after 500 hours of exposure of the asphaltic sealant product in a fluorescent UV laboratory accelerated weathering device, the asphaltic sealant product, when cooled to a temperature of 0° C., will not break into two or more pieces when bent 180° around a steel mandrel which is 12.7 mm in diameter.

In another aspect, there is provided an asphaltic sealant composition which preferably comprises: (a) a base asphalt material in an amount in a range of from 50% to 89% by weight based upon a total weight of the asphaltic sealant composition; (b) a pigment in an amount in a range of from 10% to 30% by weight based upon the total weight of the asphaltic sealant composition; and (c) an epoxidized ester of a vegetable oil in an amount in a range of from 1% to 5% by weight based upon the total weight of the asphaltic sealant composition.

In another aspect, the asphaltic sealant composition just described preferably also comprises one or more of: (i) the pigment being rutile titanium dioxide or iron (III) oxide; (ii) the epoxidized ester of the vegetable oil being present in an amount of from 2% to 5% by weight based upon the total weight of the asphaltic sealant composition; (iii) a radial SBS polymer and/or a linear SBS polymer in a total amount in a range of from 3% to 8% by weight based upon the total weight of the asphaltic sealant composition; and/or (iv) crumb rubber in an amount in a range of from 3% to 8% by weight based upon the total weight of the asphaltic sealant composition.

In another aspect, there is provided a method of preparing an asphaltic sealant composition to eliminate or reduce a color contrast between the asphaltic sealant composition and a substrate. The method preferably comprises the steps of: (a) preparing a concentrate composition comprising (i) an amount of a pigment in a concentration in a range of from 30% to 45% by weight based upon a total weight of the concentrate composition, (ii) an amount of an epoxidized ester of a vegetable oil in a concentration in a range of from 4% to 10% by weight based upon the total weight of the concentrate composition, and (iii) an amount of a base asphalt material in a concentration in a range of from 45% to 66% by weight based upon the total weight of the concentrate composition; (b) mixing the concentrate composition using a mixer operating at less than 750 rpm; (c) adding at least an additional amount of the base asphalt material to the concentrate composition sufficient to form a final asphaltic sealant composition in which the concentration of the pigment material is reduced to an amount in a range of from 10% to 25% by weight based upon a total weight of the final asphaltic sealant composition; and (d) mixing the final sealant composition using a mixer operating at less than 750 rpm.

In another aspect, the method just described preferably additionally comprises one or more of: (i) the pigment being rutile titanium dioxide or iron (III) oxide; (ii) the epoxidized ester of a vegetable oil being an expoxidized ester of soybean oil; (iii) also adding a radial SBS polymer and/or a linear SBS polymer in step (c) in a total amount in a range of from 3% to 8% by weight based upon the total weight of the final asphaltic sealant composition; (iv) also adding crumb rubber in step (c) in an amount in a range of from 3% to 8% by weight based upon the total weight of the final asphaltic sealant composition; and/or (v) a further step, after step (d), of applying the final asphaltic sealant composition to a crack or joint in the substrate.

Further aspects, features, and advantages of the present invention will be apparent to those in the art upon reading the following detailed description of the preferred embodiments.

DETAILED DESCRIPTION OF THE PREFERRED EMBODIMENTS

In the composition and method of the present invention, one or more pigment and/or UV absorbing materials is/are incorporated in an asphaltic crack sealant composition in an amount and in a manner effective to provide increased UV resistance and/or produce a color of the inventive crack sealant composition which is significantly more similar to, and/or has less of a contrast to, the color of the aged asphalt, aggregate, or concrete road, pavement, or other substrate surface to which the inventive crack sealant is applied.

The one or more pigment and/or UV absorbing materials used in the inventive asphaltic sealant composition for providing increased resistance to UV exposure can be any pigment material(s), UV absorbing material(s) or combination thereof which will provide increased UV resistance. The one or more pigment and/or UV absorbing materials will preferably be effective for providing "a modified ASTM C793-05 (Reapproved 2017) test result" for the asphaltic sealant composition. ASTM C793-05 (Reapproved 2017) is entitled Standard Test Method for Effects of Laboratory Accelerated Weathering on Elastomeric Joint Sealants. As used herein and in the claims, the term "modified ASTM C793-05 (Reapproved 2017) test result" refers to a test result obtained for the asphaltic sealant product in question using the same test method set forth in ASTM C793-05 (Reapproved 2017) except that the mandrel bend test set forth in ASTM C793-05 (Reapproved 2017) is performed by cooling the sample and the steel mandrel to a temperature of 0° C., rather than −26° C. as called for in the standard test.

Examples of pigments suitable for use in the inventive asphaltic crack sealant composition for providing increased UV resistance, and/or reduced color contrast when used on aged and other asphalt or concrete substrates, include but are not limited to, rutile titanium dioxide, anatase titanium dioxide, antimony trioxide, barium sulfate, lead (II) carbonate, and zinc oxide. These pigments are referred to herein as Group I pigments. The Group I pigment preferred for use in the inventive sealant composition for (i) providing increased UV resistance or (ii) matching, or at least reducing the amount of visual contrast with, the coloration of typical asphalt or concrete substrates, is rutile titanium oxide.

Examples of pigments suitable for use in the inventive sealant composition for providing reduced color contrast when used on aged road, pavement, or other substrate surfaces having a red coloration include, but are not limited to, those from iron oxides, and the hydrates of iron oxide salts. These pigments are referred to herein as Group II pigments. Red pigments from iron oxide are commonly referred to in the industry as "iron red oxide" or simply "Pigment Red." The Group II pigment preferred for use in the inventive composition for matching, or at least reducing the amount of visual contrast with, the coloration of reddish substrates is iron (111) oxide. Group II pigments are also suitable for use in the inventive sealant composition for providing increased UV resistance.

Examples of UV absorbing materials suitable for use in the inventive sealant composition and method for increasing UV resistance include, but are not limited to, hindered amine light stabilizers (HALS).

Preferably, the type and the total amount of the one or more pigment and/or UV absorbing materials used in the asphaltic sealant product will be effective to provide a modified ASTM C793-05 (Reapproved 2017) test result wherein, after 500 hours of exposure of the asphaltic sealant product in a fluorescent UV laboratory accelerated weathering device, the asphaltic sealant composition, when cooled to a temperature of 0° C. will not break into two or more pieces when bent 180° around a steel mandrel which is 12.7 mm in diameter.

The asphaltic composition to which the one or more pigment and/or UV absorbing materials for increased UV resistance or reduced color contrast is/are added preferably comprises a base asphalt and one or more additives of the type used in sealant compositions. The base asphalt can generally be any viscosity, penetration, or Performance Graded (PG) asphalt using the Performance Grading AASHTO asphalt specification. Examples of suitable base asphalt materials include, but are not limited to, asphalts graded as PG 64-22. PG 58-28, PG 67-22, AC-5, AC-10, AC-20, AC-30, 40-60 pen, 60-70 pen, 85-100 pen, or 120-150 pen.

Examples of additives suitable for use in the inventive sealant compositions include, but are not limited to, radial Styrene-butadiene-Styrene (SBS) polymers. linear SBS polymers, elastomers including ethylene vinyl acetate (EVA) copolymers, polyethylene, polypropylene, and terpolymers of ethylene and butyl acrylate containing glycidyl methacrylate comonomer, available as "Elvaloy" or "Lotader". Suitable additives also include recycled tire rubber or "crumb rubber" of various mesh or particle sizes.

As mentioned above, for matching or reducing the amount of contrast with the color of most aged asphalt or other pavement materials, the Group I pigment used in the inventive composition will preferably be rutile, which is a form of the mineral titanium dioxide ($TiO_2$). When dispersed in asphalt in accordance with the present invention, rutile $TiO_2$, or other Group I pigment used in the inventive composition, will modify the deep, jet black color of the asphalt. The dispersed rutile $TiO_2$ or other Group I pigment changes the visual appearance of the asphalt from jet black to various shades of brown (i.e., dark brown to light brown to tan). The resulting shade of brown depends upon the amount (weight %) of the $TiO_2$ or other Group I pigment added to the asphalt, and the degree to which the particles are dispersed in the asphalt. Better dispersion of the rutile $TiO_2$ or other Group I pigment in the asphalt composition gives better reflection of light from the rutile or other particles, which results in an overall lighter brown color and greater UV resistance.

We have discovered that the use of from about 10% to about 30% by weight rutile $TiO_2$ or other Group I pigment (based upon the total weight of the inventive sealant composition) in the inventive composition can provide an acceptable shade of brown that creates less contrast with pavement substrates. More preferably, from about 15% to about 25% of rutile $TiO_2$ or other Group I pigment will be added to the asphalt composition to affect a good balance of color and resistance to sedimentation. Most preferably. the amount of rutile $TiO_2$ or other Group I pigment added to the asphalt will be in the range of from about 18% to about 22% by weight in order to optimize color and resistance to sedimentation.

Similarly, when using iron (III) oxide or other Group II pigments, the pigment will preferably be present in the inventive reddish sealant composition in an amount of from 10% to 30%, more preferably from 15% to 25% and more preferably from 18% to 22%. by weight based upon the total weight of the final composition.

For the inventive asphaltic sealant product having increased resistance to UV exposure, the one or more pigment and/or UV absorbing materials used in the composition will preferably be present in a total amount of from 10% to 30%, more preferably from 15% to 27% and more preferably from 18% to 24%, by weight based upon the total weight of the final composition. The one or more pigment or UV absorbing materials used for increased UV resistance will preferably be rutile titanium dioxide.

Rutile $TiO_2$, as well as at least most of the other Group I and Group II pigments, are much denser than asphalt and will therefore tend to settle-out of the asphalt or form a sediment if not suitably dispersed. In terms of dispersion, high shear and/or high-speed mixing creates a better dispersion of $TiO_2$ or other pigment particles in the asphalt, as compared to using low shear or "paddle" blending, and is therefore a preferred technique for use in the inventive method. High shear mixing can more effectively overcome the forces of attraction between adjacent $TiO_2$ or other pigment particles, thereby breaking up and dispersing $TiO_2$ or other pigment agglomerates into separate particles to provide more surface area for scattering (reflecting) light.

As used herein, the term "high speed and/or high shear" means the use of mixing equipment that provides high rates of rotation, typically in excess of 1000 rotations per minute (rpm) and more typically in excess of 2000 rpm. The high shear mixing also forces the material through a small or narrow gap, thus imparting relatively high levels of shear stress to the material and helping to break apart and disperse agglomerations.

Examples of devices and systems suitable for high speed and/or high shear mixing of the inventive compositions include, but are not limited to, Silverson® laboratory mixers with high shear milling beads, rotor-stator mills, and Cowles mixers. The high speed and/or high shear mixing of the inventive compositions will preferably be conducted at a temperature in the range of from about 150° C. to about 225° C., more preferably from about 170° C. to about 200° C., and at mixing speeds in excess of 1000 rpm and more preferably in excess of 2000 rpm. This mixing is continued until full homogeneity and consistent color is achieved, preferably for a minimum of one hour and more preferably for a minimum of 2 hours.

Unfortunately, because the rutile $TiO_2$ or other Group 1 or Group II pigments used in the inventive composition are very hard and abrasive materials, they can cause significant mechanical wear when using high-cost milling equipment with tight engineering tolerances. For this reason, it would also be of great benefit if the $TiO_2$ or other pigment could alternatively be dispersed using a standard, lower cost, and lower energy mixer such as provided by a simple, low shear and low rpm paddle stirrer or agitator. Typically, these mixers impart lower shear levels to the blend and rotate at rates of less than 1000 rpm and more typically less than 500 rpm.

Consequently, in accordance with an alternative low speed embodiment of the inventive method, we have discovered that by first preparing a $TiO_2$, iron (III) oxide, or other pigment and/or UV absorbing material concentrate at higher levels of the one or more pigment and/or UV absorbing materials in a smaller amount of the base asphalt material, sufficient particle-to-particle shear can be achieved at low speed mixing conditions to adequately disperse the $TiO_2$ or other material in the asphalt to create the color and/or UV resistance effect desired while also minimizing the propensity of the $TiO_2$ or other pigment and/or UV absorbing material to settle-out. The concentration of the rutile $TiO_2$ or other pigment and/or UV absorbing material in the concentrate will preferably be in the range of from about 30% to about 45% by weight, more preferably from about 35% to about 45% by weight and more preferably in the range of from about 36% to about 40% by weight, based on the total weight of the concentrate composition.

As used herein, the term "low speed" means a speed of less than 1000 rpm, more preferably less than 750 rpm, more preferably 500 rpm or less, and more preferably less than 500 rpm, and includes agitators or mixers of a simple, low speed design using unsophisticated paddles or blades to impart mixing to the blend.

Furthermore, we have discovered that modifying the rutile $TiO_2$ or other pigment and/or UV absorbing material used to produce the pigment concentrate with one or more dispersing agents selected from epoxidized esters of vegetable oils and/or plasticizers enhances the dispersion of the pigment and/or UV absorbing material(s) and helps to prevent or reduce sedimentation and enhance UV resistance. Without being bound by theory, the inventors believe that the epoxidized ester of the vegetable oil or plasticizer is attracted to the surface of the titanium dioxide or other particles, creating a surface layer of bound molecules that resists the re-agglomeration of the dispersed titanium dioxide or other particles.

Examples of epoxidized esters of vegetable oils suitable for use in the pigment concentrate include, but are not limited to, epoxidized esters of soybean oil, corn oil, tall oil, and sunflower oil. The epoxidized ester of vegetable oil will preferably be an epoxidized ester of soybean oil and will most preferably be an epoxy functionalized methyl ester of soybean oil. Examples of other epoxidized esters of soybean oil suitable for use in the present invention include, but are not limited to, benzyl, propyl, and ethyl esters of soybean oil.

The epoxy functionalized ester of vegetable oil and/or plasticizer used in the low-speed alternative method and composition will preferably be present in an amount in the range of from about 1% to about 10% by weight of the total weight of the asphaltic concentrate composition. More preferably, the epoxidized ester of vegetable oil and/or plasticizer will be present in the concentrated composition, during the dispersion step, at a concentration of at least 2% and more preferably from about 4% to about 8% by weight based upon the total weight of the concentrate composition. An example of an epoxy functionalized methyl ester of soybean oil preferred for use in the inventive method is EMS-100, a product produced by ACS of Indiana.

To form the final sealant product composition in accordance with the inventive low speed method, the concentrated composition is preferably mixed with a "let down" composition which comprises the remaining amounts of the base asphalt material and additives needed to arrive at substantially the same final asphalt concentration and concentration of pigment and/or UV absorbing material(s) as described above for the high speed and/or high shear embodiment of the inventive composition. The "let down" composition components can be added to the concentrated composition as a single blend of all of the "let down" components or can be added as one or more components at a time, preferably beginning with the remaining amount of the base asphalt material.

More preferably, the final sealant product composition produced by the inventive low speed method using a concentrated composition will comprise: from about 10% to about 30% by weight rutile $Tio_2$, iron (III) oxide or other suitable pigment and/or UV absorbing material(s); from about 1% to about 5% by weight of the one or more epoxidized esters of vegetable oil or plasticizers; and from about 50% to about 89% by weight of the base asphalt. More preferably, the final sealant composition produced by the inventive low speed method using a concentrated composition will comprise: from about 15% to about 25% by weight (or from 15% to 27% for enhanced UV resistance) rutile $TiO_2$, iron (III) oxide, or other suitable pigment and/or UV absorbing material(s); from about 2% to about 4% by weight of the one or more epoxy functionalized esters of vegetable oil and/or plasticizers; and from about 55% to about 75% by weight of the base asphalt.

The final sealant composition will also preferably comprise: (i) from 3% to 8% by weight of a radial or linear SBS polymer or a mixture of radial and linear SBS polymers and (ii) from 3% to 8% by weight of a 30 or 40 mesh crumb rubber. More preferably, the final sealant composition will comprise from 5% to 7% by weight of a radial SBS polymer, or a radial and linear SBS polymer blend, and from 5% to 7% by weight ofa 30 or 40 mesh crumb rubber.

Examples of suitable low-speed mixing devices or systems preferred for use in dispersing the $TiO_2$, iron (III) oxide, or other pigment and/or UV absorbing materials in the initial concentrated composition and for mixing the concentrate composition with the "let down" blend to form the final sealant composition include, but are not limited to, low speed paddle mixers or agitators.

In the low-speed embodiment of the inventive method, the $TiO_2$, iron (III) oxide, or other suitable pigment and/or UV absorbing material is/are preferably dispersed in the concentrate composition at a temperature in the range of from about 150° C. to about 225° C., more preferably from about 170° C. to about 200° C., at 50-500 rpm for a period of time sufficient to result in complete homogeneity of the blend, typically a minimum of one hour and more preferably a minimum of 2 hours. Subsequently, the mixing of the concentrate composition with the "let down" blend is preferably conducted at a temperature in the range of from about 150° C. to about 225° C., more preferably from about 170° C. to about 200° C., at 50-500 rpm for a period of time sufficient to result in complete homogeneity of the blend, typically a minimum of one hour and more preferably a minimum of 2 hours.

The following examples are provided for illustration purposes and are not intended to limit the invention in any way.

Example 1

A low shear pigment concentrate was produced using 40% by weight of rutile $TiO_2$ that had been surface treated with zirconia alumina to enhance the dispersion of the $TiO_2$ in non-polar media. The remainder of the pigment concentrate comprised base asphalt graded as PG 64-22 using the Performance Grading AASHTO asphalt specification. The PG 64-22 base asphalt comprised about 52.4% by weight of the pigment concentrate composition. EMS-100 (an epoxidized methyl ester of soybean oil) manufactured by ACS of Indiana comprised the remaining 7.6% of the pigment concentrate.

The pigment concentrate was stirred using a simple laboratory paddle mixer for 2 hours at about 177° C. until a dispersion of uniform color and consistency was achieved. The resulting pigment concentrate was then diluted with additional PG 64-22 asphalt, radial SBS polymer, and crumb rubber to provide the final sealant composition. The amount of the pigment concentrate used was 55% by weight of the final sealant composition. The additional asphalt, polymer, and crumb rubber constituted the "letdown blend" and comprised the remaining 45% by weight of the final blend. The "letdown blend" comprised 77.8% by weight of PG 64-22 dilution asphalt, 13.3% by weight of radial Styrene-butadiene-Styrene (SBS) polymer type LG 411, and 8.9% by weight of a 40 mesh crumb rubber.

The combined pigment concentrate and "letdown blend" was stirred with a simple laboratory paddle mixer at 177-180° C. until a uniform and homogeneous blend was formed. The final sealant composition comprised 63.8% by weight PG 64-22 base asphalt, 22.0% by weight $TiO_2$, 4.2% by weight epoxidized methyl ester of soybean oil, 6.0% by weight radial SBS polymer, and 4.0% by weight crumb rubber and is referred to hereinafter as Sample 1. Sample 1 demonstrated acceptable properties and performance as summarized below in Table 2.

Example 2

A low shear pigment concentrate was produced using 40% by weight of rutile $TiO_2$ that had been surface treated with zirconia alumina to enhance the dispersion of the $TiO_2$ in non-polar media. The remainder of the pigment concentrate comprised (a) a base asphalt graded as PG 64-22 using the Performance Grading AASHTO asphalt specification and (b) EMS-100 (an epoxidized methyl ester of soybean oil) manufactured by ACS of Indiana. The PG 64-22 comprised about 53.6% by weight of the pigment concentrate with the epoxidized methyl ester of soybean oil comprising the remaining 6.4% by weight.

The pigment concentrate was stirred using a simple laboratory paddle mixer for 2 hours at about 177° C. until a dispersion of uniform color and consistency was achieved. Despite the lower level of epoxidized methyl ester of soybean oil used in this Example, the pigment concentrate had acceptable homogeneity.

The pigment concentrate was then diluted with a "letdown blend" comprising 75.6% by weight PG 64-22 dilution asphalt, 13.3% radial Styrene-butadiene-Styrene (SBS) polymer type 411, and 11.1% of 40 mesh crumb rubber to provide a final sealant composition. The resulting final sealant composition comprised: (a) 55% by weight of the pigment concentrate and (b) 45% by weight of the "letdown blend". The higher level of crumb rubber in this composition was believed to provide enhanced absorption of the epoxidized methyl ester of soybean oil, thereby helping to reduce the tackiness of the final sealant composition.

The combined pigment concentrate and "letdown blend" were stirred using a simple laboratory paddle mixer at 177-180° C. until a uniform and homogeneous blend was formed. The final sealant composition comprised 63.5% by weight PG 64-22 base asphalt, 22.0% by weight $TiO_2$, 3.5% by weight epoxidized methyl ester of soybean oil, 6.0% by weight radial SBS polymer, and 5.0% by weight crumb rubber and is referred to hereinafter as Sample 2. Sample 2 showed acceptable properties and performance as summarized below in Table 2, and was less tacky than Sample 1.

Example 3

A low shear pigment concentrate was produced using 40% by weight of rutile $TiO_2$ that had been surface treated with zirconia alumina to enhance the dispersion of the $TiO_2$ in non-polar media. The remainder of the pigment concentrate comprised (a) a base asphalt graded as PG 64-22 using the Performance Grading AASHTO asphalt specification and (b) EMS-100 (an epoxidized methyl ester of soybean oil) manufactured by ACS of Indiana. The PG 64-22 comprised about 54.5% by weight of the pigment concentrate with the epoxidized methyl ester of soybean oil comprising the remaining 5.5% by weight.

The pigment concentrate was stirred using a simple laboratory paddle mixer for 2 hours at about 177° C. until a dispersion of uniform color and consistency was formed. Despite the lower level of epoxidized methyl ester of soybean oil used in this Example, the pigment concentrate had acceptable homogeneity.

The pigment concentrate was then diluted with a "letdown blend" comprising 75.6% by weight PG 64-22 dilution asphalt, 13.3% by weight radial Styrene-butadiene-Styrene (SBS) polymer type 411, and 11.1% by weight 40 mesh crumb rubber to provide a final sealant composition. The final sealant composition comprised: (a) 55% by weight of the pigment concentrate and (b) 45% by weight of the "letdown blend". The higher level of crumb rubber was believed to provide enhanced absorption of the epoxidized methyl ester of soybean oil, thereby helping to reduce the tackiness of the final sealant composition.

The combined pigment concentrate and "letdown blend" were stirred with a simple laboratory paddle mixer under low shear at 177-180° C. until a uniform and homogeneous blend was formed. The final sealant composition comprised 64.0% by weight PG 64-22 base asphalt, 22.0% by weight $TiO_2$, 3.0% by weight epoxidized methyl ester of soybean oil, 6.0% by weight radial SBS polymer, and 5.0% by weight crumb rubber and is referred to hereinafter as Sample 3. Sample 3 showed acceptable properties and performance as summarized below in Table 2 and was slightly less tacky than Sample 1.

Example 4

A low shear, red pigment concentrate was first produced using 35.6% by weight of iron (III) oxide. The remainder of the red pigment concentrate comprised PG 64-22 base asphalt (58% by weight) and EMS-100 (5.5% by weight). The pigment concentrate was stirred using a laboratory paddle mixer at 500 RPM for 2 hours at 177° C. until a deep, dark red dispersion of uniform color and consistency was formed.

The pigment concentrate was then diluted with additional PG 64-22 base asphalt and a blend of radial and linear SBS polymers was added. The diluted composition was mixed using the laboratory mixer. When the SBS polymer blend was fully digested, 40-mesh crumb rubber was added and the stirring was continued for another 2 hours at 191'C. The final sealant composition (referred to hereinafter as Sample 4) comprised: 20% by weight of the iron (III) oxide red pigment; 68.5% by weight PG 64-22 base asphalt; 5.5% by weight of the SBS polymer blend, 3% by weight EMS-100; and 3% by weight 40-mesh crumb rubber. The iron (III) oxide pigment used in Sample 4 gave the sealant a deep, dark red color. Sample 4 showed acceptable properties and performance as summarized below in Table 2.

TABLE 1

Preferred Embodiments of the Invention

| Sample | Mass % Pigment | Pigment Type | Mass % SBS | Mass % EMS-100** | Mass % Crumb Rubber |
|---|---|---|---|---|---|
| 1 | 22 | $TiO_2$ | 6 | 4.2 | 4 |
| 2 | 22 | $TiO_2$ | 6 | 3.5 | 5 |
| 3 | 22 | $TiO_2$ | 6 | 3 | 5 |
| 4 | 20 | Iron (III) Oxide | 5.5 | 3 | 3 |
| Black, prior art sealant | 0 | None | 7 | 1 | 7 |

Note:
Balance of weight % composition is base asphalt PG 64-22 or AC-20
**EMS-100 is an Epoxidized Methyl Ester of Soybean Oil

TABLE 2

Physical Properties of the Embodiments of the Invention

| Sample | Rotational Viscosity 177° C. (cps) | Rotational Viscosity 200° C. (cps) | R&B Soft Point (° F.) | R&B Soft Point (° C.) | DSR MSCR, 76° C., 3.2 kPa, Jnr (1/kPa) | 4° C. Ductility (cm) |
|---|---|---|---|---|---|---|
| 1 | 3362 | 2150 | 207 | 97 | 0,5437 | 52 |
| 2 | 5250 | 2750 | 210 | 99 | 0.1961 | 34 |
| 3 | 4687 | 2562 | 216 | 102 | 0.1342 | 30.5 |
| 4 | 2588 | 1475 | 206 | 96.5 | N/A | N/A |
| Black, prior art sealant | 8450 | 3950 | 249 | 121 | 0.0175 | N/A |

Example 5

Another sample of the inventive sealant composition as prepared in Example 2 was subjected to a modified form of the accelerated weathering test set forth in ASTM C793-05 (Reapproved 2017). For comparison purposes, a commercial sealant product of substantially the same composition, but without the presence of the rutile titanium dioxide pigment material, was subjected to the same modified test. The modified form of the accelerated weathering test used the same standard steps and protocols as described in ASTM C793-05 (Reapproved 2017) except that the mandrel bend test set forth in ASTM C793-05 (Reapproved 2017) was performed by cooling the samples and the steel mandrel to a temperature of 0° C. rather than −26° C. as called for in the standard test.

In these tests, the samples of the inventive asphaltic sealant product and the commercial sealant were each subjected to 500 hours of exposure in a fluorescent UV laboratory accelerated weathering device. After the UV weathering procedure, the commercial sealant exhibited extensive surface cracking or "checking" whereas the inventive sealant product showed less surface cracking and deterioration. Also after the UV weathering procedure, each of the samples was subjected to a modified mandrel bend test, as described above, in which (t) the sample and a 12.7 mm diameter steel mandrel were cooled to 0° C. and then (2) the cooled sample was quickly bent 180° around the mandrel. In the mandrel bend test, the UV weathered sample of the inventive asphaltic sealant product surprisingly remained intact (i.e., did not break) whereas the UV weathered sample of the prior art commercial product broke into two pieces.

The ability of a sealant to maintain flexibility at low temperature, especially after long periods of exposure to UV radiation, is critical to the ability of the sealant to perform its intended function of sealing joints and cracks from water intrusion. Without being bound by any particular theory, it is believed that the presence of the rutile $TiO_2$ pigment material had the unexpected and additional beneficial effect of protecting the sealant from UV exposure by reflecting some of the incident UV radiation away from the sealant, allowing it to degrade less and remain more flexible after exposure.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. An asphaltic sealant composition which is resistant to UV exposure, the asphaltic sealant composition comprising:
   asphalt in an amount in a range of from 50% to 89% by weight based upon a total weight of the asphaltic sealant composition, the asphalt having a jet black color;
   titanium dioxide dispersed in the asphalt in an amount in a range of from 10% to 30% by weight based upon the total weight of the asphaltic sealant composition, and at a degree of dispersion, which provides a modified ASTM C793-05 (Reapproved 2017) test result for the asphaltic sealant composition; and
   one or more epoxidized esters of vegetable oils, present in the asphaltic sealing composition in a total amount, greater than or equal to 1% by weight based upon the total weight of the asphaltic sealant composition, which provides a degree of dispersion of the titanium dioxide in the asphaltic sealant composition to provide the modified ASTM C793-05 (Reapproved 2017) test result,
   the modified ASTM C793-05 (Reapproved 2017) test result being that, after 500 hours of exposure of the asphaltic sealant composition in a fluorescent UV laboratory accelerated weathering device, the asphaltic sealant composition, when cooled to a temperature of 0° C., will not break into two or more pieces when bent 180° around a steel mandrel which is 12.7 Mm in diameter.

2. The asphaltic sealant composition of claim 1 comprising the titanium dioxide being dioxide.

3. The asphaltic sealant composition of claim 1 comprising the amount of the titanium dioxide being in a range of from 15% to 27% by weight based upon the total weight of the asphaltic sealant composition.

4. The asphaltic sealant composition of claim 1 comprising the one or more epoxidized esters of vegetable oils being an epoxidized ester of soybean oil.

5. The asphaltic sealant composition of claim 4 comprising the epoxidized ester of soybean oil being present in the asphaltic sealant composition in an amount in a range of from 1% to 5% by weight based upon the total weight of the asphaltic sealant composition.

6. The asphaltic sealant composition of claim 1 further comprising:
 a radial SBS polymer and/or a linear SBS polymer in a total amount in a range of from 3% to 8% by weight based upon the total weight of the asphaltic sealant composition and/or
 crumb rubber in an amount in a range of from 3% to 8% by weight based upon the total weight of the asphaltic sealant composition.

7. The asphaltic sealant composition of claim 6 comprising:
 the one or more epoxidized esters of vegetable oils being an epoxidized ester of soybean oil;
 the titanium dioxide being rutile titanium dioxide;
 the rutile titanium dioxide being present in an amount of from 15% to 27% by weight based upon the total weight of the asphaltic sealant composition;
 the epoxidized ester of soybean oil being present in an amount of from 2% to 5% by weight based upon the total weight of the asphaltic sealant composition;
 the radial SBS polymer and/or the linear SBS polymer being present in a total amount of from 3% to 8% by weight based upon the total weight of the asphaltic sealant composition; and
 the crumb rubber being present in an amount of from 3% to 8% by weight based upon the total weight of the asphaltic sealant composition.

8. An asphaltic sealant composition which is resistant to UV exposure, the asphaltic sealant composition comprising:
 asphalt in an amount in a range of from 50% to 89% by weight based upon a total weight of the asphaltic sealant composition, the asphalt having a jet black color;
 iron (III) oxide dispersed in the asphalt in an amount in a range of from 10% to 30% by weight based upon the total weight of the asphaltic sealant composition, and at a degree of dispersion, which provides a modified ASTM C793-05 (Reapproved 2017) test result for the asphaltic sealant composition; and
 one or more epoxidized esters of vegetable oils present in the asphaltic sealing composition in a total amount, greater than or equal to 1% by weight based upon the total weight of the asphaltic sealant composition, which provides a degree of dispersion of the iron (III) oxide in the asphaltic sealant composition to provide the modified ASTM C793-05 (Reapproved 2017) test result,
 the modified ASTM C793-05 (Reapproved 2017) test result being that, after 500 hours of exposure of the asphaltic sealant composition in a fluorescent UV laboratory accelerated weathering device, the asphaltic sealant composition, when cooled to a temperature of 0° C., will not break into two or more pieces when bent 1800 around a steel mandrel which is 12.7 mm in diameter.

9. The asphaltic sealant composition of claim 8 comprising the one or more epoxidized esters of vegetable oils being an epoxidized ester of soybean oil.

10. The asphaltic sealant composition of claim 9 comprising the epoxidized ester of soybean oil being present in the asphaltic sealant composition in an amount in a range of from 1% to 5% by weight based upon the total weight of the asphaltic sealant composition.

11. The asphaltic sealant composition of claim 8 further comprising:
 a radial SBS polymer and/or a linear SBS polymer in a total amount in a range of from 3% to 8% by weight based upon the total weight of the asphaltic sealant composition and/or
 crumb rubber in an amount in a range of from 3% to 8% by weight based upon the total weight of the asphaltic sealant composition.

12. The asphaltic sealant composition of claim 11 comprising:
 the one or more epoxidized esters of vegetable oils being an epoxidized ester of soybean oil;
 the epoxidized ester of soybean oil being present in an amount of from 2% to 5% by weight based upon the total weight of the asphaltic sealant composition;
 the radial SBS polymer and/or the linear SBS polymer being present in a total amount of from 3% to 8% by weight based upon the total weight of the asphaltic sealant composition; and
 the crumb rubber being present in an amount of from 3% to 8% by weight based upon the total weight of the asphaltic sealant composition.

* * * * *

UNITED STATES PATENT AND TRADEMARK OFFICE
CERTIFICATE OF CORRECTION

PATENT NO. : 11,760,881 B1
APPLICATION NO. : 17/225369
DATED : September 19, 2023
INVENTOR(S) : Joseph Drbohlav, III, Joseph J. Lorenc and Thomas John Haslett It is certified that error appears in the above-identified patent and that said Letters Patent is hereby corrected as shown below:

In the Claims

Claim 2, Column 13, Line 2, Add "rutile titanium" between the words being and dioxide Signed and Sealed this
Seventh Day of November, 2023

Katherine Kelly Vidal
*Director of the United States Patent and Trademark Office*